(12) United States Patent
Taguchi

(10) Patent No.: US 6,433,796 B1
(45) Date of Patent: *Aug. 13, 2002

(54) APPARATUS AND METHOD FOR DISPLAYING BOTH AN IMAGE AND CONTROL INFORMATION RELATED TO THE IMAGE

(75) Inventor: Tomishige Taguchi, Urawa (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/130,480

(22) Filed: Aug. 7, 1998

Related U.S. Application Data

(62) Division of application No. 08/676,895, filed on Jul. 8, 1996, now Pat. No. 5,793,367, which is a continuation of application No. 08/175,869, filed on Dec. 30, 1993, now abandoned.

(30) Foreign Application Priority Data

Jan. 7, 1993 (JP) .............................................. 5-001051

(51) Int. Cl.⁷ .............................................. G06F 13/00
(52) U.S. Cl. ...................... 345/753; 345/716; 345/723; 345/733; 348/159
(58) Field of Search ................................ 345/327, 474, 345/330, 340, 341, 348, 349, 328, 329; 348/214, 211, 169, 159; 709/204

(56) References Cited

U.S. PATENT DOCUMENTS

| | | | |
|---|---|---|---|
| 4,752,836 A | 6/1988 | Blanton et al. | 386/84 |
| 4,910,604 A | 3/1990 | Takei et al. | 386/95 |
| 4,992,866 A | * 2/1991 | Morgan | 348/159 |
| 4,995,071 A | 2/1991 | Weber et al. | 348/15 |
| 5,153,833 A | 10/1992 | Gordon et al. | 701/26 |
| 5,155,584 A | 10/1992 | Taguchi et al. | 348/231 |
| 5,191,639 A | 3/1993 | Hara | 700/264 |
| 5,218,627 A | 6/1993 | Corey et al. | 348/16 |
| 5,231,517 A | 7/1993 | Taguchi | 358/453 |
| 5,231,693 A | 7/1993 | Backes et al. | 700/264 |
| 5,235,680 A | 8/1993 | Bijnagte | 707/10 |
| 5,237,648 A | 8/1993 | Mills et al. | 345/433 |
| 5,793,367 A | * 12/1993 | Taguchi | 345/330 |
| 5,303,384 A | 4/1994 | Rodriquez et al. | 700/264 |
| 5,323,470 A | 6/1994 | Kara et al. | 382/103 |
| 5,341,459 A | 8/1994 | Backes | 700/260 |
| 5,375,068 A | * 12/1994 | Palmer et al. | 345/330 |
| 5,477,546 A | * 12/1995 | Shibata et al. | 370/260 |
| 5,479,206 A | 12/1995 | Ueno et al. | 348/211 |
| 5,568,183 A | 10/1996 | Cortjens et al. | 348/14.1 |
| 5,570,177 A | * 10/1996 | Parker et al. | 356/139.06 |
| 5,689,663 A | * 11/1997 | Williams | 395/327 |

FOREIGN PATENT DOCUMENTS

JP          1-114171          5/1989

* cited by examiner

Primary Examiner—Raymond J. Bayerl
Assistant Examiner—Tadesse Hailu
(74) Attorney, Agent, or Firm—Fitzpatrick, Cella, Harper & Scinto

(57) ABSTRACT

An electronic apparatus includes a display and a data processor for processing data. First output circuitry outputs the data processed by the data processor to the display in order to display the data. An image pickup device picks up an object image and outputs motion-image data. Second output circuitry outputs to the display (i) the motion-image data output by the image pickup device, and (ii) control-window data for controlling the image pickup device. Preferably, camera pan and zoom icons are displayed on a computer display and may be used to pan and zoom a camera to place the camera moving image within an image display area on the same computer display.

16 Claims, 17 Drawing Sheets

|  | 3BYTES | 2BYTES | | |
|---|---|---|---|---|
| ● , | APPARATUS TO BE CONTROLLED | KIND OF OPERATION COMMAND | EXTENSION FLAG | ---------- |

APPARATUS AND METHOD FOR DISPLAYING BOTH AN IMAGE AND CONTROL INFORMATION RELATED TO THE IMAGE

This is a divisional application of Application No. 08/676,895, filed Jul. 8, 1996, now U.S. Pat. No. 5,793,367, which is a continuation of Ser. No. 08/175,869 filed Dec. 30, 1993 now abandoned.

BACKGROUND OF THE INVENTION

1. Field of the Invention

This invention relates to an electronic apparatus, and a control method therefor, and more particularly, to an electronic apparatus which is suitable for controlling image pickup means of the user and/or the communication partner (for example, in a video conference system), and a control method therefor.

2. Description of the Related Art

According to the provision of a digital and high-speed public communication network, it becomes possible to utilize a video conference system and a visual telephone system in which a moving image and a voice are simultaneously transmitted.

In a conventional video-conference or visual-telephone terminal, a camera for photographing meeting members or a speaker is mounted on a camera mount, so that panning, tilting, zooming, the control of the diaphragm and the like of the camera can be controlled using, for example, dedicated operation knobs on an operation panel of the user's apparatus. These functions can also be subjected to remote control by the communication partner's apparatus via a communication network.

In the above-described conventional configuration, however, the method of operating the operation knobs or the like is not related to the user's intuition and therefore is difficult to operate.

SUMMARY OF THE INVENTION

The present invention has been made in consideration of the above-described problems.

It is an object of the present invention to provide an electronic apparatus which is easy to operate.

It is a further object of the present invention to provide a method of controlling an electronic apparatus which is easy to operate.

It is a still further object of the present invention to provide an electronic apparatus which is easy to operate and a method for controlling the apparatus when controlling image-pickup means.

It is still another object of the present invention to provide a new user interface for an image-pickup device.

It is still a further object of the present invention to provide an electronic apparatus having new functions.

It is yet another object of the present invention to provide an electronic apparatus which can perform a new type of control for an image pickup device.

According to one aspect, the present invention which achieves these objectives relates to an electronic apparatus comprising data processing means for processing data, first output means for outputting the data processed by the data processing means to display means in order to display the data, image pickup means for picking up an object image and for outputting motion-image data, and second output means for outputting motion-image data output by the image-pickup means and control-window data for controlling the image-pickup means to the display means.

According to another aspect, the present invention relates to a method for controlling an electronic apparatus including data processing means for processing provided data and output means for outputting the data processed by the processing means to display means in order to display the data, comprising the steps of generating motion-image data from image-pickup means, and outputting the motion-image data and control-window data for controlling the image pickup means to the display means.

According to still another aspect, the present invention relates to an electronic apparatus for controlling respective control factors for image pickup means generating a motion-image signal, comprising display means for displaying an image signal from the image pickup means on an image display area together with control icons for the respective control factors, pointing means for controlling the respective control icons, and control means for controlling the image pickup means in accordance with an operation of a control icon by the pointing means.

According to yet another aspect, the present invention relates to a method of controlling an electronic apparatus including image pickup means, comprising the steps of displaying an image signal from the image pickup means together with control icons corresponding to respective control factors for the image pickup means when controlling the respective control factors, and controlling the image pickup means in accordance with an operation of a displayed control icon.

According to still a further aspect, the present invention relates to an electronic apparatus including image pickup means, comprising means for assigning areas for an object assigned by pointing means on a display picture surface, calculation means for calculating an angle of rotation and an amount of zooming of the image pickup means for zooming an image within the areas in the display picture surface, and control means for controlling a rotation driving unit and a zooming driving unit of the image-pickup means in accordance with the calculated values.

The foregoing and other objects, advantages and features of the present invention will become more apparent from the following description of the preferred embodiments taken in conjunction with the accompanying drawings.

BRIEF DESCRIPTION OF THE DRAWINGS

FIG. 6 is a format of a remote control command;

DESCRIPTION OF THE PREFERRED EMBODIMENTS

Preferred embodiments of the present invention will now be described with reference to the drawings.

In an embodiment of the present invention, a moving image photographed by a camera is displayed on a window in an image display window system as a dedicated window (camera display/control window) for controlling the camera. Camera control cursors for panning, tilting, zooming, the diaphragm and the like of the camera are displayed on the camera display/control window. These cursors are assigned by one of various kinds of pointing devices (a mouse, a track ball and the like) or point input devices (a digitizer tablet, a touch panel and the like), and are moved on the picture surface.

A main-body CPU (central processing unit) controls panning, tilting, zooming, the control of the diaphragm or the like of the camera in accordance with the movement of the corresponding camera control cursor. The main-body CPU also functions as the CPU of a work station, a personal computer or the like, and therefore can perform various kinds of processing as in an ordinary computer.

Figure 1:
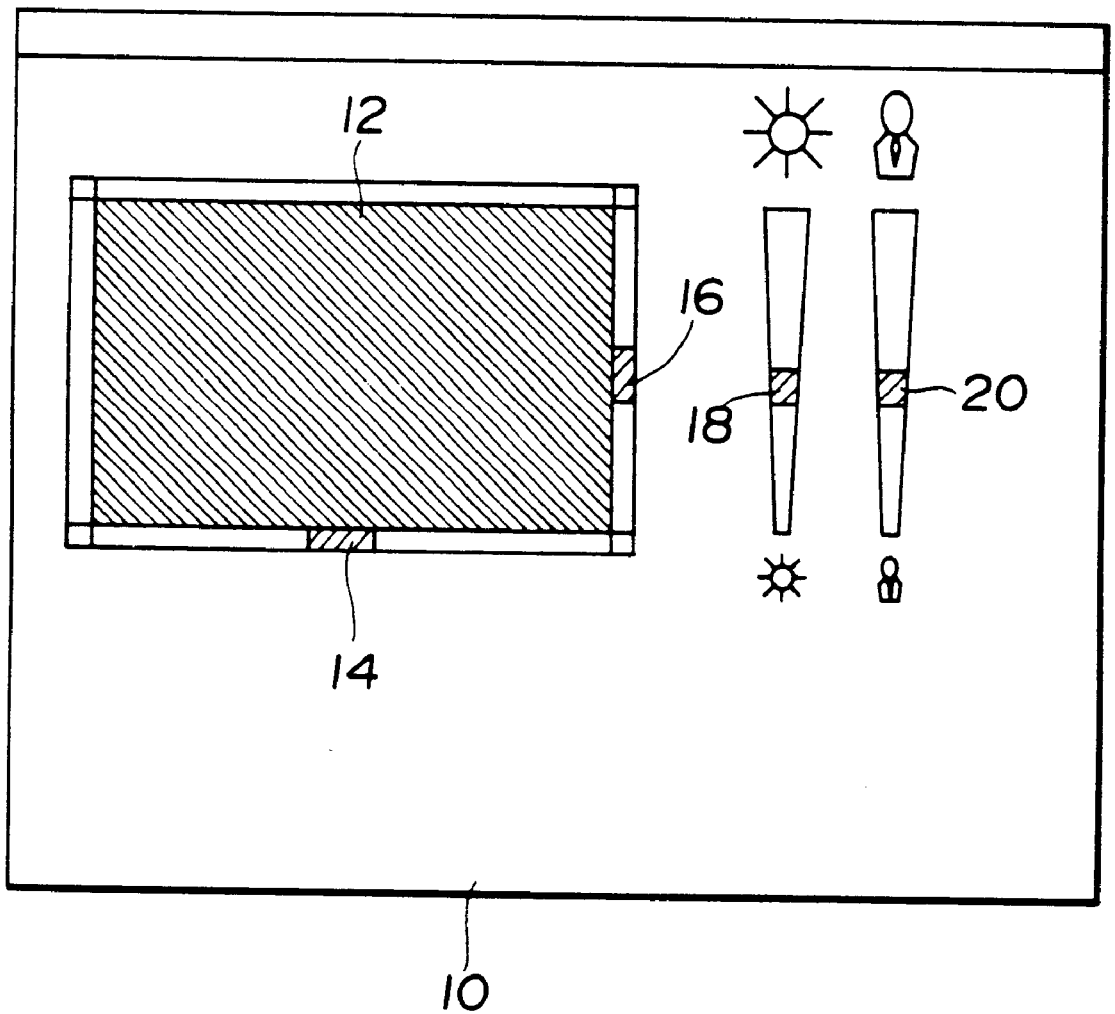
FIG. 1 is a schematic diagram illustrating the configuration of a picture surface according to an embodiment of the present invention.

FIG. 1 illustrates a camera display/control window of the embodiment. In camera display/control window 10, camera-image display area 12 for displaying an image photographed by the camera is set, and panning-control cursor 14 and tilting-control cursor 16 are set below and at the right of camera-image display area 12, respectively. Panning-control cursor 14 can freely move within the range of the horizontal width of camera-image display area 12, and tilting-control cursor 16 can freely move within the range of the vertical width of camera-image display area 12.

Panning-control cursor 14 allocates the range of panning of the video camera to be controlled within the movable range of the cursor, and is displayed at a position corresponding to the current angle of panning. Tilting-control cursor 16 functions in the same manner as panning-control cursor 14.

Diaphragm-control cursor 18 is set at the right of tilting-control cursor 16, and zooming-control cursor 20 is set at the right of diaphragm-control cursor 18. These cursors can freely move in the vertical direction. The diaphragm is opened to a greater degree as diaphragm-control cursor 18 is located at a higher position, and the zoom magnification has a greater value as zooming-control cursor 20 is located at a higher position.

By moving these control cursors 14, 16, 18 and 20 in respective predetermined directions, the amounts of control of panning, tilting, the diaphragm and zooming of the camera are input to the main-body CPU. When displaying an image from the user's camera in camera-image display area 12, the image is displayed while being inverted in the horizontal direction using a mirror-image forming circuit. When displaying an image from the communication partner's camera, the image is displayed without being inverted.

Figure 2:
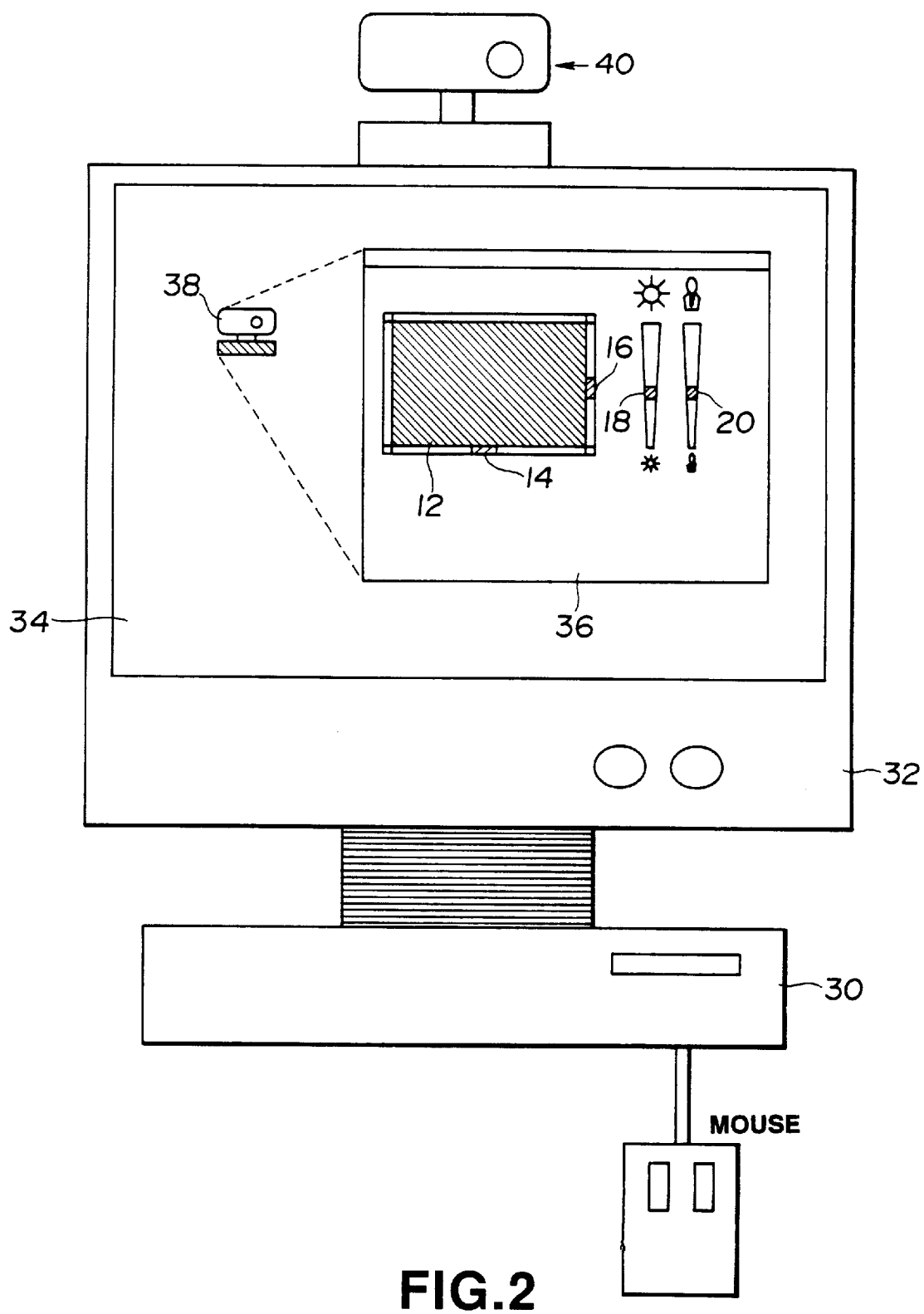
FIG. 2 is a diagram illustrating an external appearance of a terminal of the embodiment.

FIG. 2 is a front view illustrating an external appearance of a terminal. Main body 30 incorporates well-known circuit devices, such as a CPU board, a memory board, a floppy disk drive, a hard disk drive and the like. Camera display/control window 36 described with reference to FIG. 1 is displayed within full picture surface 34 of monitor 32. The same reference numerals as those shown in FIG. 1 are indicated for the camera-image display area and the respective control cursors within camera display/control window 36. By selecting video-camera-view icon 38, the camera display/control window 36 is opened and displayed as shown in FIG. 2. Although it is omitted from illustration a television-meeting icon, a document icon and the like are also displayed.

Video camera 40 is installed above monitor 32. Video camera 40 incorporates a panning/tilting mount as well as video circuit and a video interface.

Figure 3A:
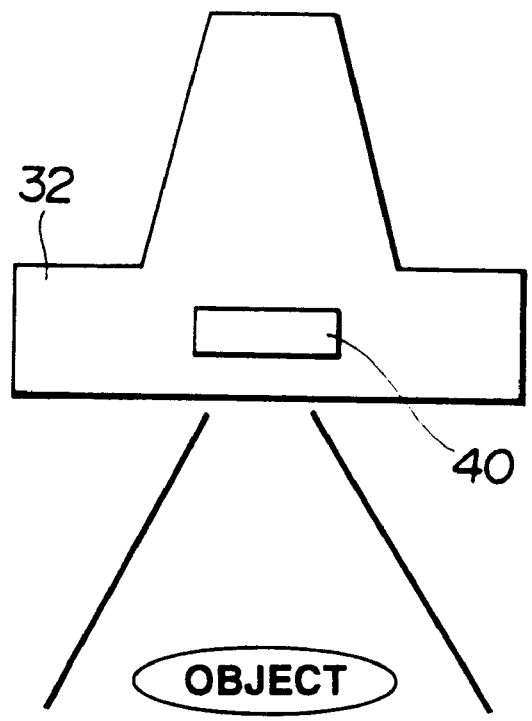
FIGS. 3(a) through 5(b) are diagrams illustrating the relationship between panning-control cursors and the angle of panning.
Figure 3B:
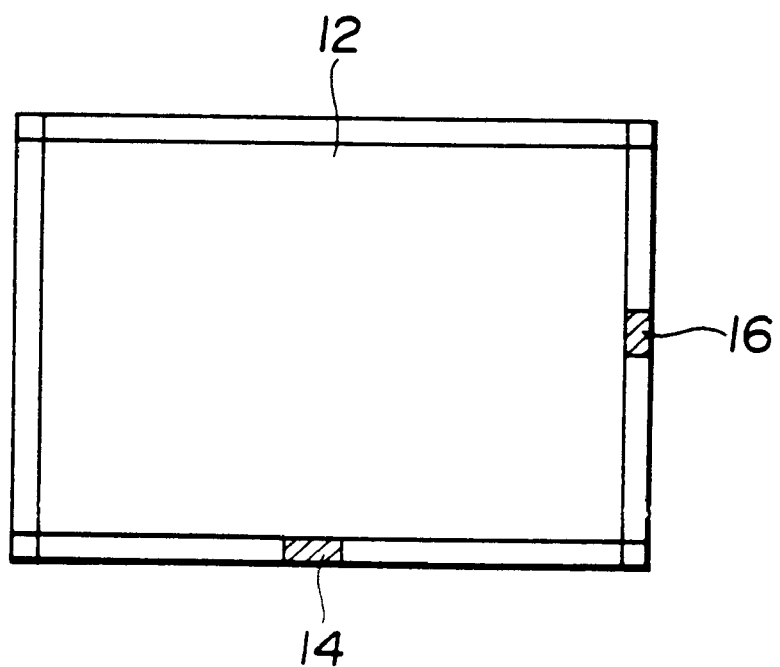
Figure 4A:
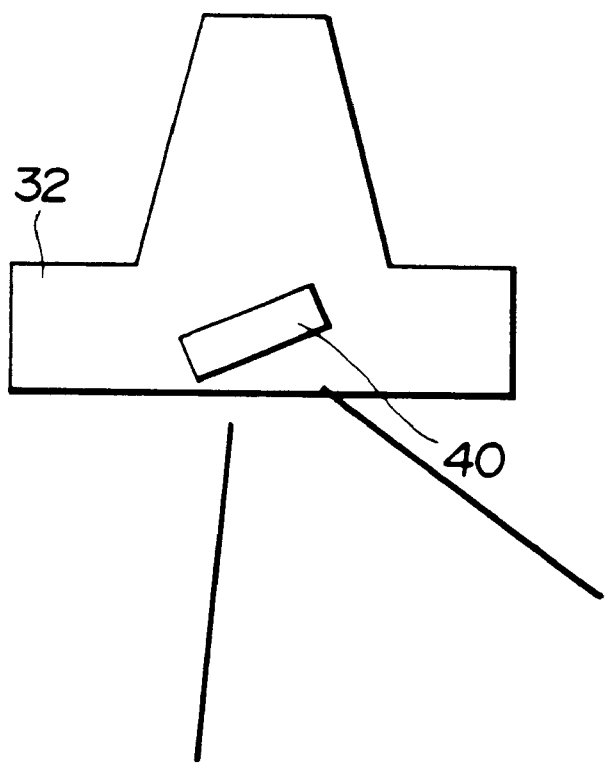
Figure 4B:
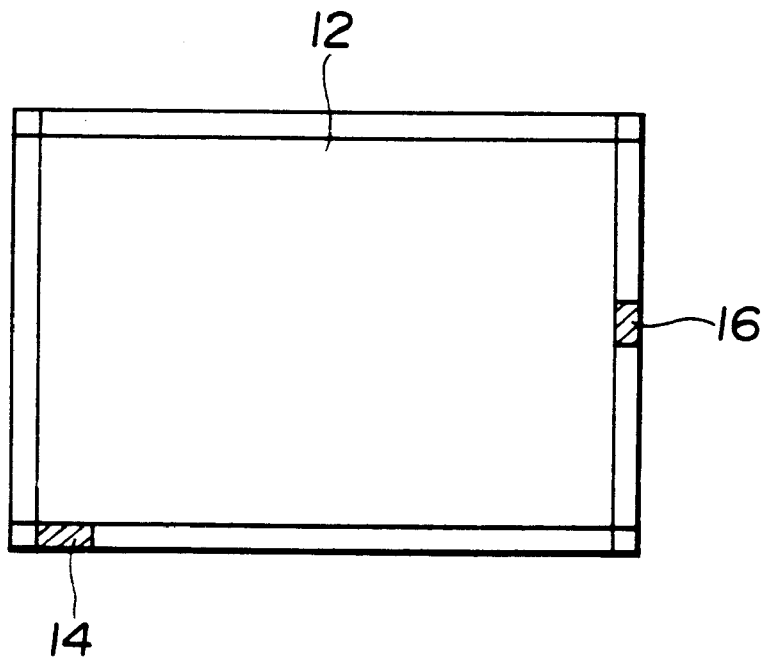
Figure 5A:
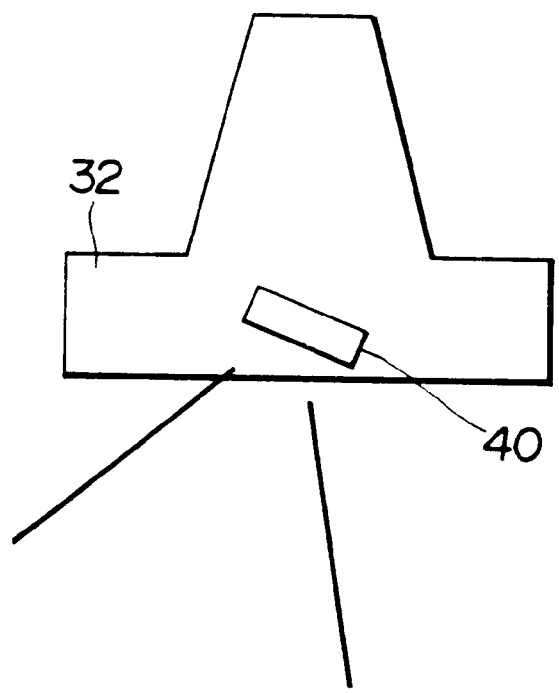
Figure 5B:
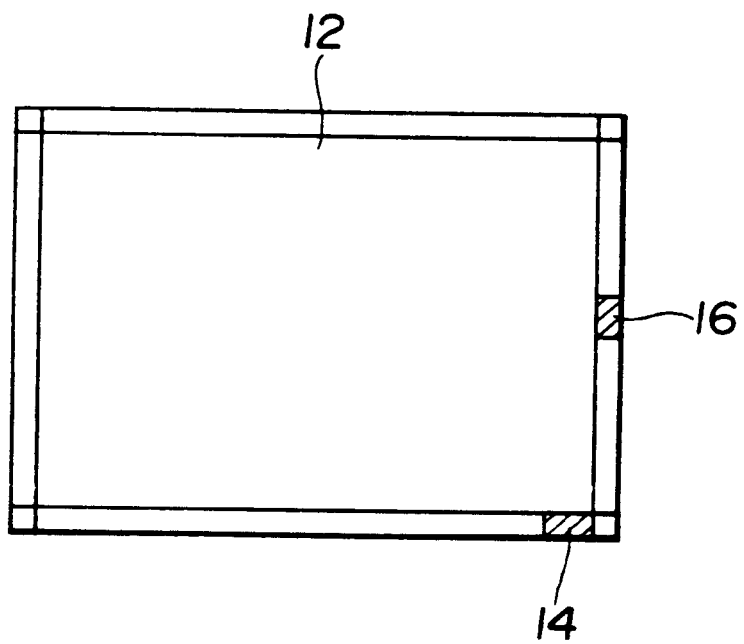

FIGS. 3($a$) through 5($b$) illustrate the corresponding relationship between the direction of panning of camera 40 and panning-control cursor 14. FIGS. 3($a$), 4($a$) and 5($a$) are plan views of the terminal shown in FIG. 2 as seen from above, and FIGS. 3($b$), 4($b$) and 5($b$) illustrate positions of panning-control cursor 14 of camera display/control window 36.

The user's video camera is controlled through the camera display/control window opened by the video-camera-view icon of the user's camera, and the communication partner's video camera is controlled through the camera display/control window opened by the video-camera-view icon of the communication partner's camera.

When controlling the communication partner's camera, the CPU within main body 30 transmits camera-control information to the communication partner's apparatus in a predetermined format. The CPU within the communication partner's apparatus performs panning and the like of the communication partner's camera in accordance with the received camera-control information. FIG. 6 illustrates a transmission format of such control information. The format includes an identifier indicating control information (";" in the present embodiment), information relating to the apparatus to be controlled (3 bytes), the kind of operation command (2 bytes), an extension flag and an extender.

For example, as for the apparatus to be controlled, camera inputs #1 and #2 are represented by "V11" and "V12", respectively. Information to identify respective apparatuses is represented by 3 bytes. The following operation commands are provided:

F0: setting of an automatic focus adjustment mode
F1: setting of a manual focus adjustment mode
F3: set the focus position to a farther position
F4: set the focus position to a nearer position
E0: perform automatic control of the diaphragm
E1: perform manual control of the diaphragm
E2: reduce the aperture value
E4: increase the aperture value
E0: designate the absolute value of the aperture value (utilizing the extender)
I0: request of initialization
S0: Request to return a status signal
Z0: setting of zooming up
Z1: setting of zooming out
Z2: move the zoom lens to the stored position (utilizing the extender)

Z5: move the zoom lens to the absolute position (utilizing the extender)
U0: panning to the right
U1: panning to the left
U2: tilt the camera upward
U3: tilt the camera downward
U4: direct movement to the stored position (utilizing the extender)
U5: designate the absolute angle of panning (utilizing the extender)
U6: designate the absolute angle of tilting (utilizing the extender)

The above-described commands represent an example, and the present invention is not limited to such commands. These operation commands may be set on the window of main body 30 of the terminal, or may be set through a keyboard connected to main body 30 of the terminal.

Figure 7:
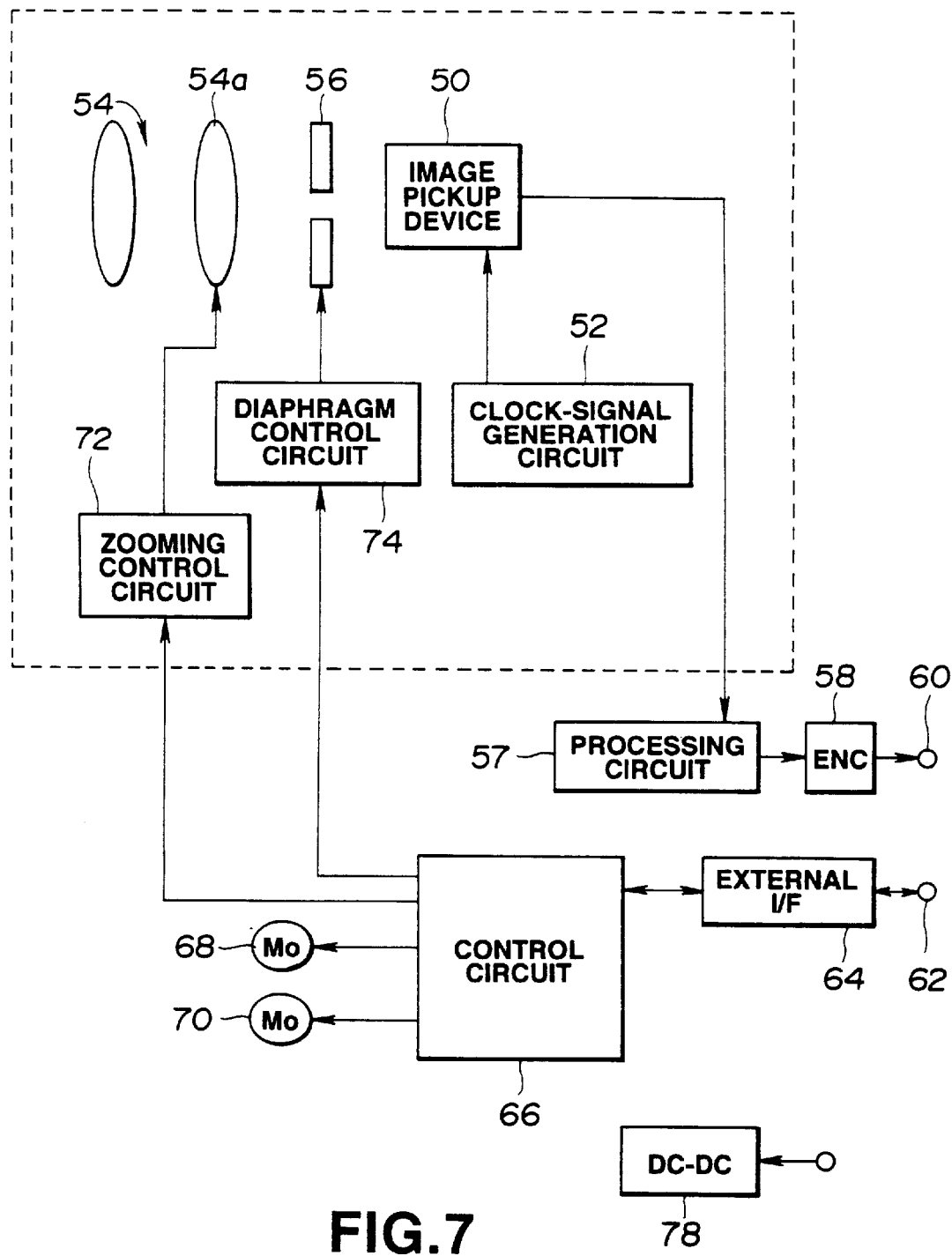
FIG. 7 is a block diagram illustrating a schematic configuration of the circuitry of video camera 40.

FIG. 7 illustrates the configuration of the internal circuitry of video camera 40. Image pickup device 50 is driven by a clock signal generated by clock-signal generation circuit 52, and converts an optical image passing through photographing lens 54 and diaphragm 56 into an electrical signal. Processing circuit 57 performs camera-signal processing, such as γ-conversion, color balance adjustment and the like, for the output of image pickup device 50. Video encoder 58 converts the output of processing circuit 57 into a predetermined video format, for example, the NTSC format. The output of video encoder 58 is supplied from video output terminal 60 to main body 30.

A camera control signal from main body 30 of the terminal is supplied to control circuit (CPU) 66 via control terminal 62 and interface 64. Control circuit 66 controls panning-control motor 68 and tilting-control motor 70, zoom lens 54a of photographing lens 54 via zooming control circuit 72, and diaphragm 56 via diaphragm control circuit 74.

Electric power necessary for these circuits is supplied from main body 30 to DC-DC converter 78 via power-supply terminal 76. DC-DC converter 78 generates and supplies power-supply voltages necessary for the recpective circuits.

In the present embodiment, image pickup device 50, clock-signal generation circuit 52, photographing lens 54, diaphragm 56, control circuits 72 and 74 are installed on a movable mount. Panning-control motor 68 pans the movable mount, and tilting-control motor 70 tilts the movable mount.

Circuitry to synthesize an image represented by a non-interlacing signal, such as an output signal from a video camera or a television signal, with an image represented by an interlacing signal of a computer is well known. An example of such circuitry will be described.

Figure 8:
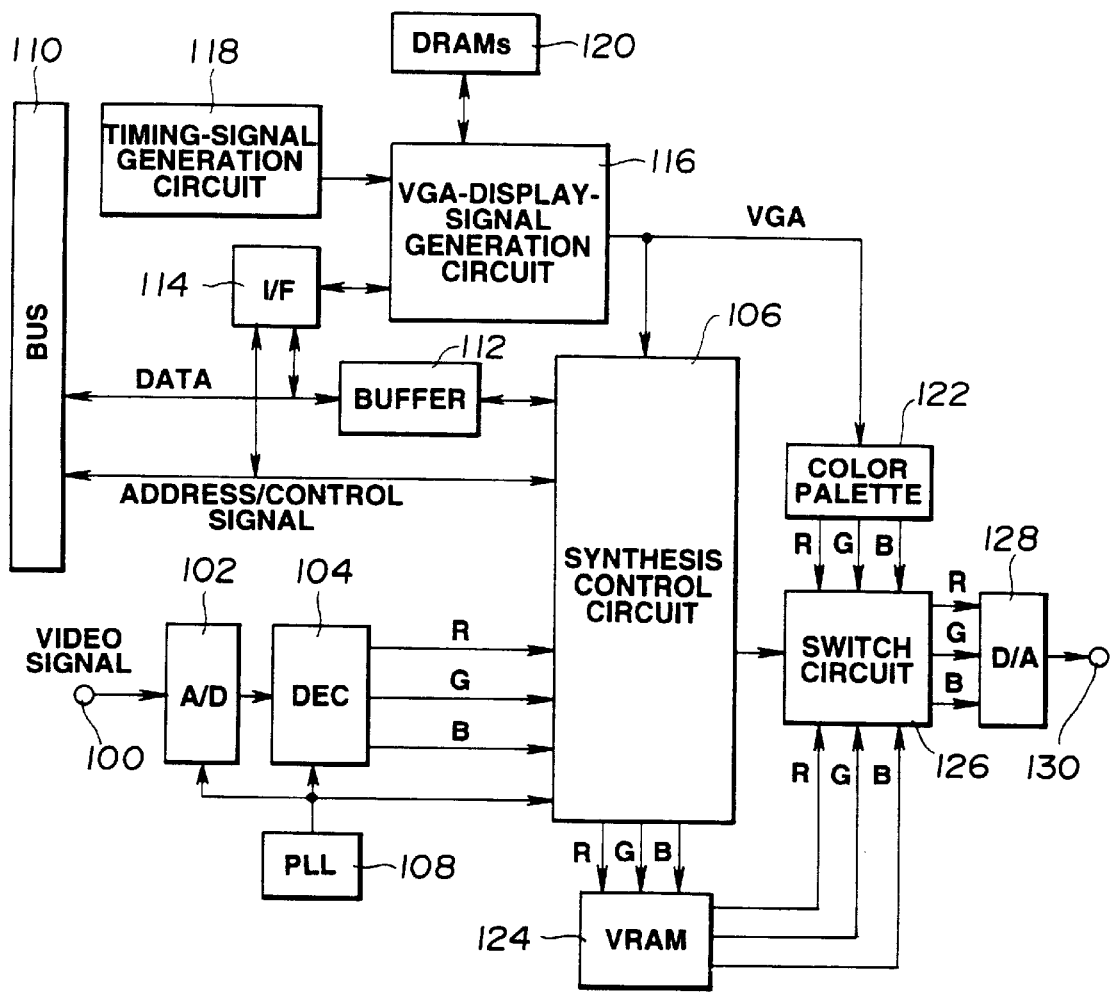
FIG. 8 is a block diagram illustrating a schematic configuration of a circuit for synthesizing a video signal and a computer image.

FIG. 8 is a block diagram illustrating a schematic configuration of circuitry incorporated within main body 30, in which a video signal from video camera 40 is superimposed on an internally generated image signal. An analog video (moving-image) signal conforming to NTSC/PAL/SECAM systems (or one of these systems) is input from video camera 40 to input terminal 100. A/D converter 102 converts the analog video (moving-image) signal from input terminal 100 into a digital signal (moving-image signal). Video decoder 104 converts the output of A/D converter 102 into an RGB format, and supplies its output to synthesis control circuit 106. PLL circuit 108 supplies a clock signal having a predetermined frequency to A/D converter 102, video decoder 104 and synthesis control circuit 110.

Data on bus 110 of main body 30 is supplied to synthesis control circuit 106 via buffer 112. An address/control signal is directly supplied to synthesis control circuit 106. Data, an address and a control signal on bus 110 of main body 30 are supplied to VGA-display-signal generation circuit 116 via bus interface 114. VGA-display-signal generation circuit 116 generates image data in the VGA form of an image to be stored in memory 120 in accordance with a timing signal from timing-signal generation circuit 118. The generated image data is supplied to synthesis control circuit 106 and color palette 122. Color palette 122 outputs RGB image data in accordance with the data from circuit 116.

Synthesis control circuit 106 writes the RGB data from video decoder 104 in video memory 124, and generates a switching control signal for switch circuit 126 in accordance with the address/control signal from bus 110. Switch circuit 126 selects one of the RGB data from color palette 122 and the RGB data from video memory 124 in accordance with the switching control signal, and outputs the selected data to D/A converter 128. D/A converter 128 converts the digital data into an analog data. The synthesized image signal is supplied from output terminal 130 to monitor 32, and the corresponding image is displayed on picture surface 34.

Figure 9:
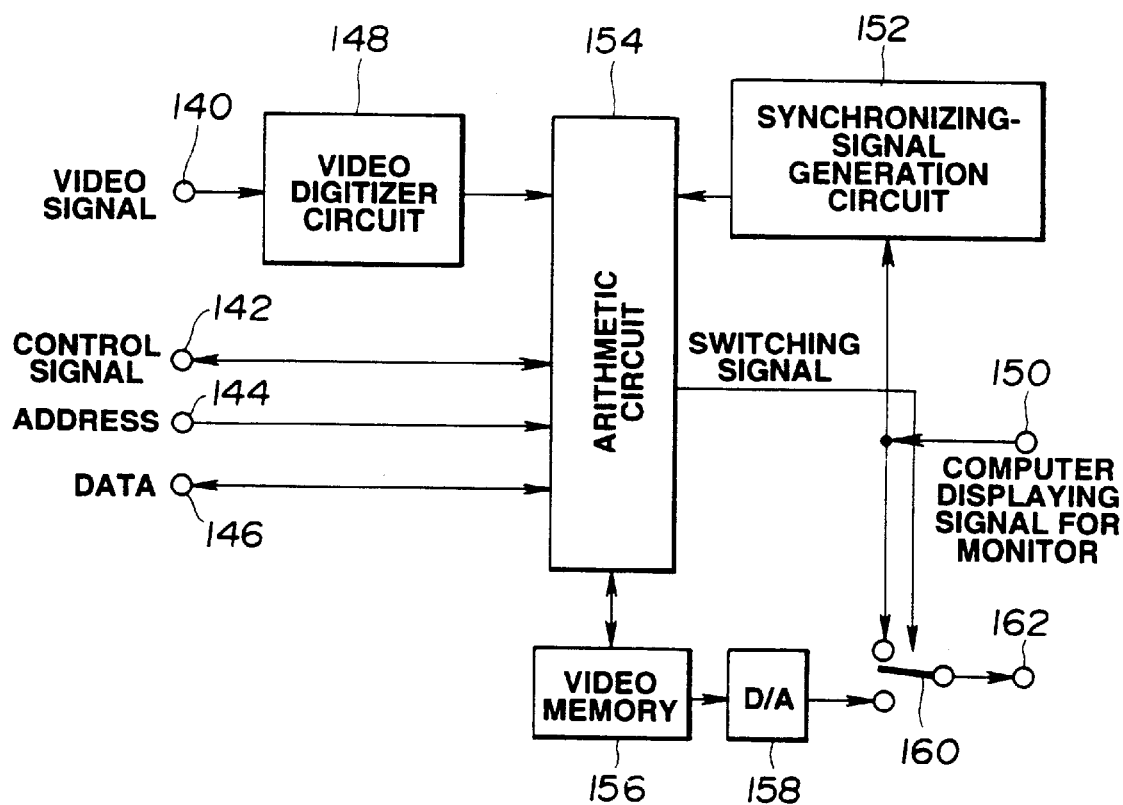
FIG. 9 is a block diagram illustrating a schematic configuration of another circuit for synthesizing a video signal and a computer image.

FIG. 9 illustrates another example of circuitry to superimpose a video signal from video camera 40 on an image signal generated within main body 30. An analog video signal from video camera 40 is input to input terminal 140. A control signal, an address and data on the system bus of main body 30 are input to input terminals 142, 144 and 146, respectively. Video digitizer circuit 148 digitizes the analog video signal from input terminal 140, and supplies the digitized signal to arithmetic circuit 154. An image signal generated by main body 30 is input to input terminal 150, and synchronizing-signal generation circuit 152 generates a synchronizing signal in accordance with the image signal.

The control signal, the address and the data from input terminals 142, 144 and 146, respectively, and the synchronizing signal from synchronizing-signal generation circuit 152 are input to arithmetic circuit 154, which performs the following calculation in accordance with the synchronizing signal from circuit 152. That is, arithmetic circuit 154 generates a switching signal for forming the image of the camera display/control window described with reference to FIG. 1 and for inserting an image obtained by changing the scanning rate of the output of circuit 148 in area 12 of the window. That is, arithmetic circuit 154 generates a switching signal between a signal representing a computer picture surface and a video signal. Arithmetic circuit 154 also writes image data generated by window control in video memory 156 in order to change the scanning rate of the output of circuit 148 using video memory 156. The data stored in video memory 156 is read at a predetermined speed, and is converted into an analog signal by D/A converter 158.

An image signal representing a computer picture surface from input terminal 150 is input to contact "a" of switch 160, and the output of D/A converter 158 is input to contact b. A signal representing a picture surface from main body 30 of the terminal is input to input terminal 150. Switch 160 is switched by the switching control signal output from arithmetic circuit 154, and the output of switch 160 is supplied to monitor 32 of the main body of the terminal via output terminal 162.

Figure 10:
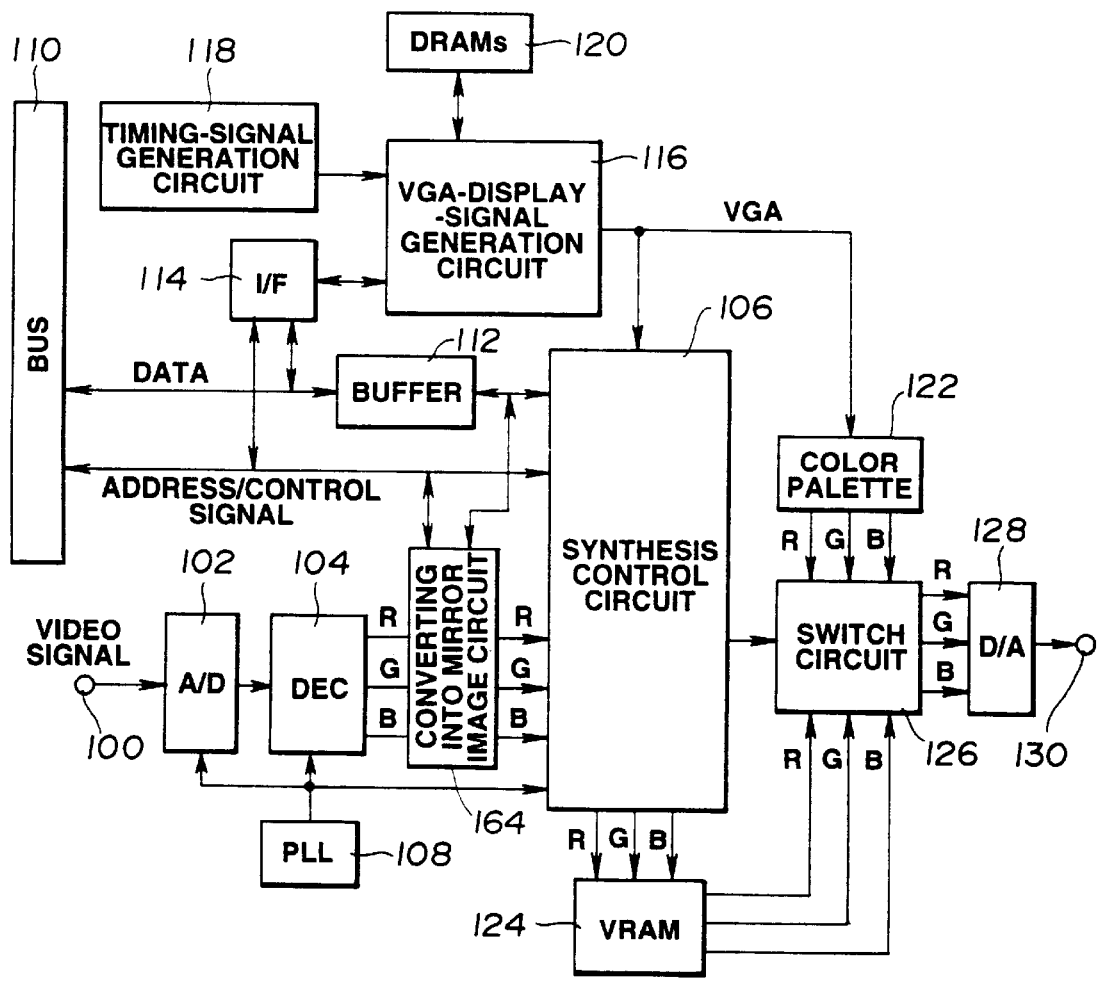
FIG. 10 is a block diagram illustrating a schematic configuration of a third circuit for synthesizing a video signal and a computer image.

When displaying an image photographed by the user's camera, it is desirable to display the image while inverting the image in the horizontal direction from the viewpoint of the human sense. In the present embodiment, this is accomplished by inverting an image represented by a video signal from video camera 40 in the horizontal direction using a mirror-image forming circuit. In the circuitry illustrated in FIG. 10, a mirror-image forming circuit is added to the circuitry shown in FIG. 8. Mirror-image forming circuit 164 is inserted between video decoder 104 and synthesis control circuit 106, and is subjected to on/off control by data, an address and a control signal on bus 110. That is, when mirror-image forming circuit 164 is turned on, the RGB image signal input from video decoder 104 is output while inverting the corresponding image in the horizontal direction. When mirror-image forming circuit is turned off, the RGB image signal input from video decoder 104 is output without being modified. Of course, when operating mirror-image forming circuit 164, the relationship between the movement of panning-control cursor 14 in the horizontal direction and the direction of panning of the user's video camera 40 is inverted.

Figure 11:
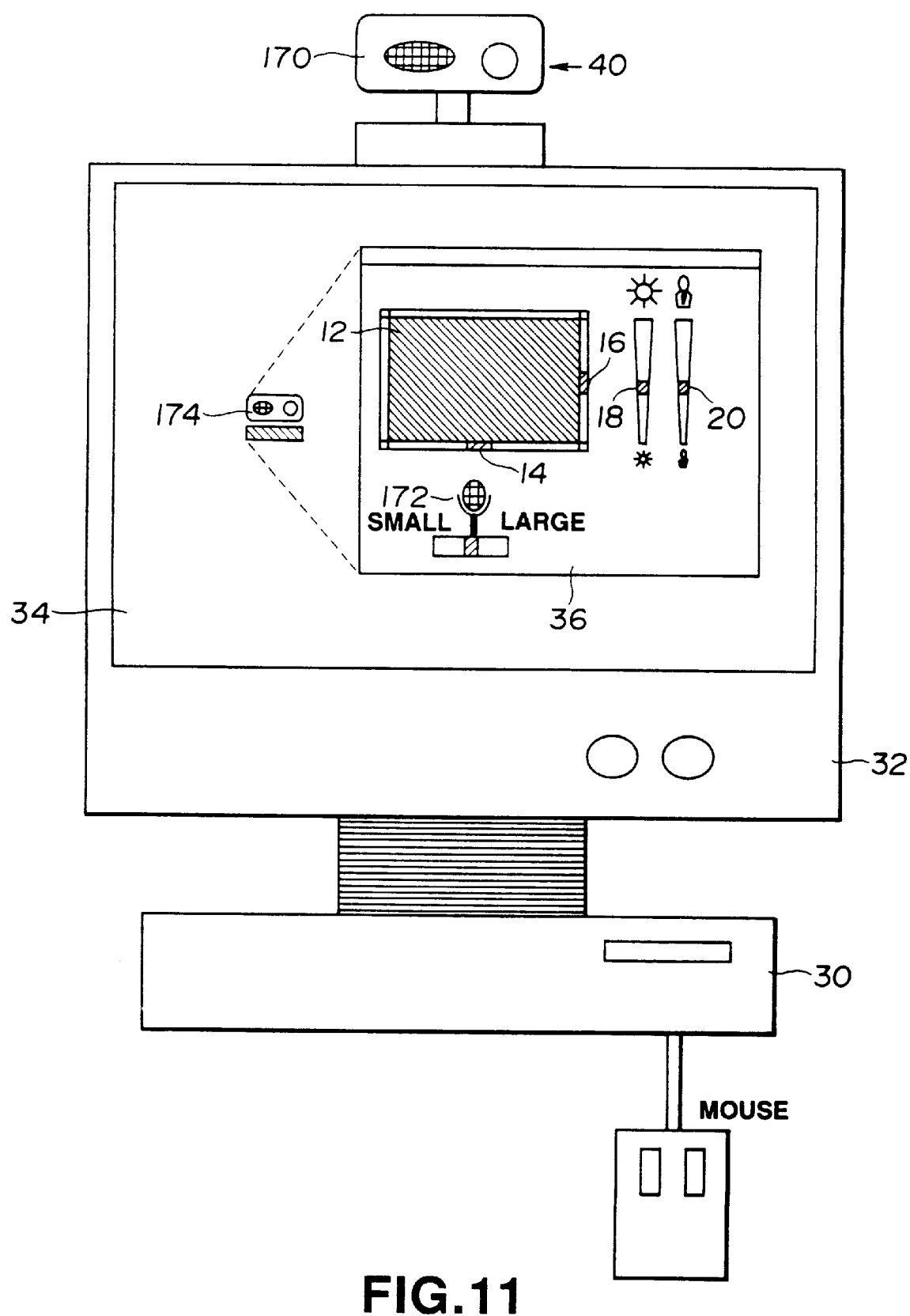
FIG. 11 is a diagram illustrating an external appearance of a terminal, in which a microphone and a sound-volume control icon are added, according to another embodiment of the present invention.

A microphone for voice input is indispensable in a video conference or a visual telephone. For example, as illustrated in FIG. 11, it is convenient if a directional microphone 170 is incorporated in video camera 40 and the direction of directional microphone 170 is changed in accordance with panning and tilting of video camera 40. At that time, as shown in FIG. 11, sound-level control icon 172 is displayed within the camera display/control window. Camera-view icon 174 displaying the microphone is also used.

Figure 12:
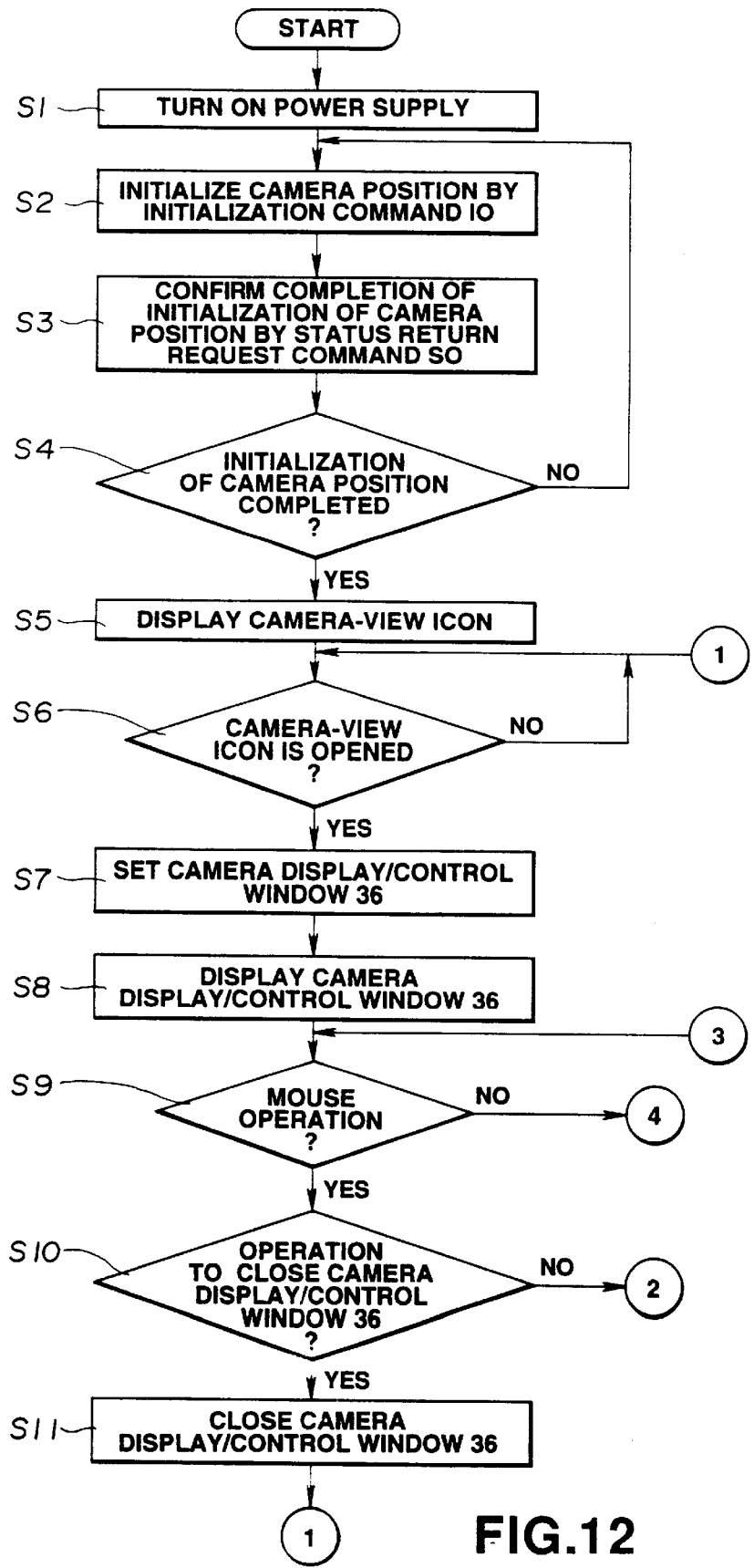
FIGS. 12 through 14 are operational flowcharts in the second embodiment.
Figure 13:
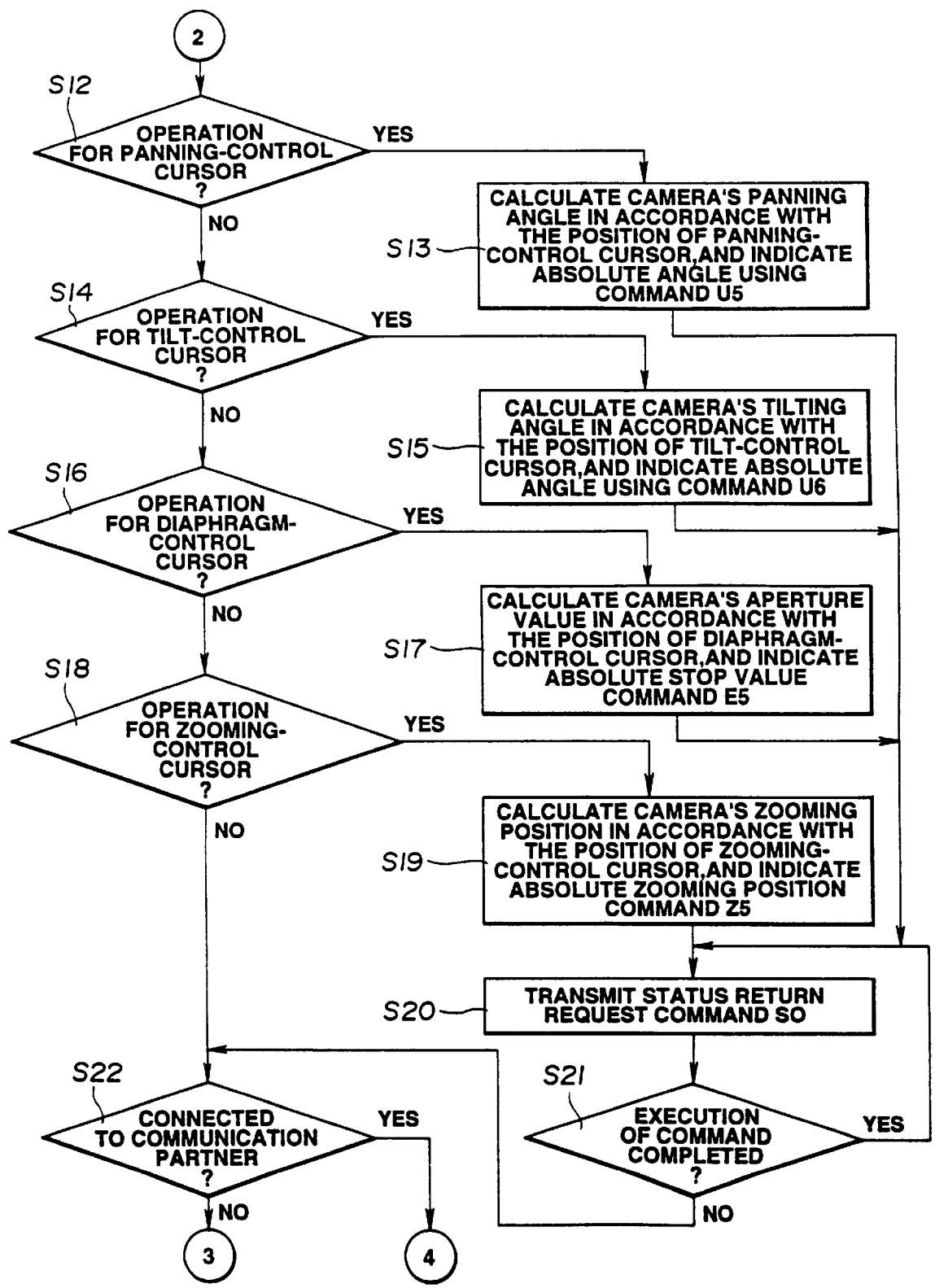
Figure 14:
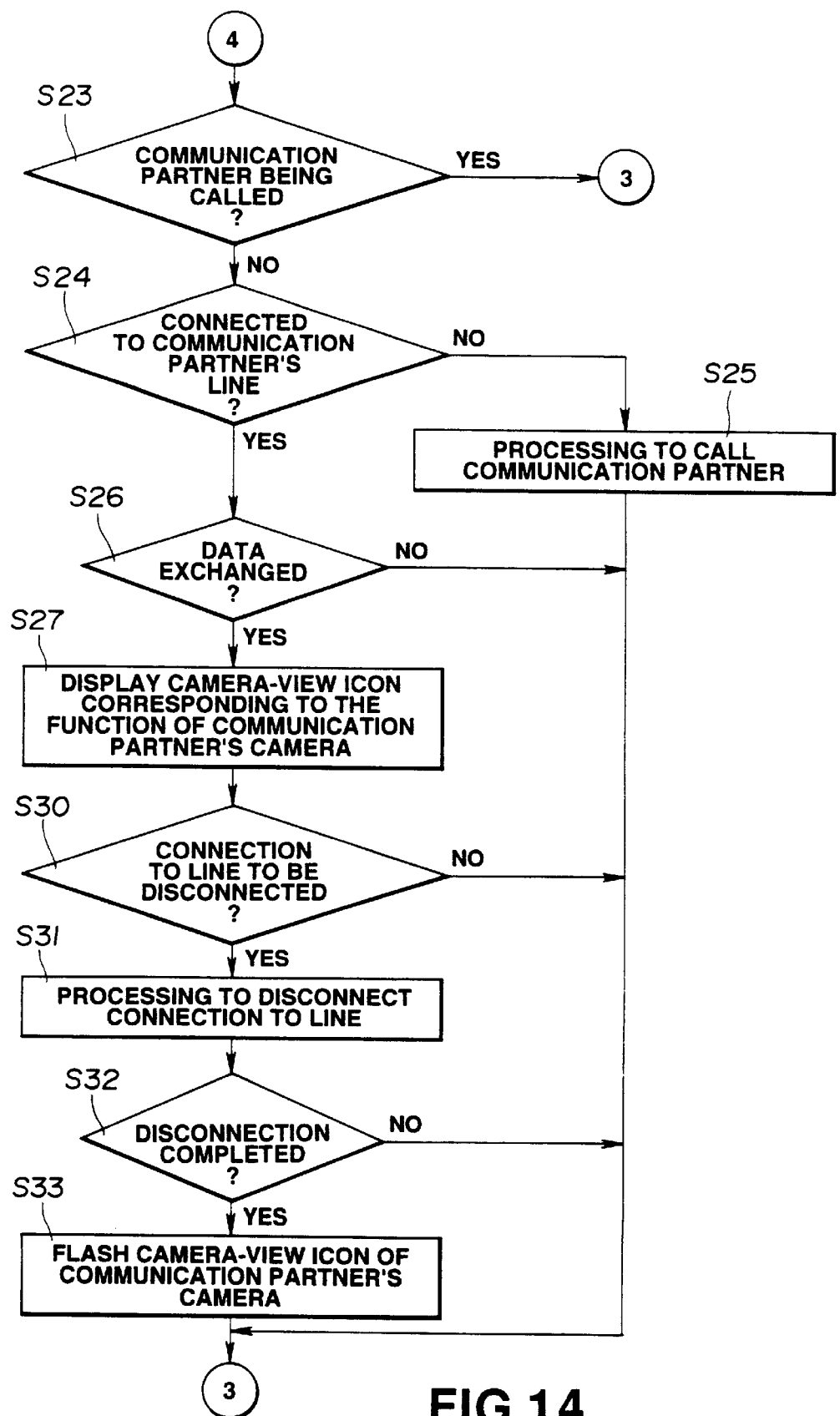

A description will now be provided of the operation of the present embodiment to perform remote control of the communication partner's video camera with reference to FIGS. 12, 13 and 14. After turning on the power supply (step S1), the setting of the communication partner's video camera to an initial position is requested by initialization command I0 (step S2). This setting includes, for example, the setting of the focus of the lens to a position to which the lens is most frequently focused. Thereafter, the apparatus of the present embodiment confirms completion of initialization of the communication partner's video camera by status return requenst command S0 (step S3). The loop of steps S2 and S3 is repeated until the initialization is completed (step S4).

When the initialization has been completed, the main body of the terminal generates a computer display signal for monitor so that video-camera-view icon 38 (or 174) of the communication partner's camera is displayed on the user's monitor (step S5). In response to the operation to open the icon 38 (or 174) (step S6), the main body of the terminal controls video memory 156 and switch 160 (see FIG. 9) so that camera display/control window 10 (or 36) is set (step S7). Camera display/control window 36 is thereby displayed on the monitor picture surface as shown in FIG. 2 (step S8).

If there is an operation for camera display/control window 36 (step S9), and if the operation is to close camera display/control window 36 (step S10), camera display/control window 36 is closed, and the process returns to step S6.

If there is an operation for panning-control cursor 14 (step S12), the process branches from step S12 to step S13, in which the main body of the terminal calculates the panning angle of the communication partner's video camera in accordance with the new position of panning-control cursor 14, and indicates the absolute panning angle by command U5.

If there is an operation for tilting-control cursor 16 (step S14), the process branches from step S14 to step S15, in which the main body of the terminal calculates the tilting angle of the communication partner's video camera in accordance with the new position of tilting-control cursor 16, and indicates the absolute tilting angle by command U6.

If there is an operation for diaphragm-control cursor 18 (step S16), the main body of the terminal calculates the stop value of the communication partner's video camera in accordance with the new position of diaphragm-control cursor 18, and indicates the absolute stop value by command E5 (step S17).

If there is an operation for zooming-control cursor 20 (step S18), the main body of the terminal calculates the zooming position of the communication partner's video camera in accordance with the new position of zooming-control cursor 20, and indicates the absolute zooming position by command Z5 (step S19).

After steps S13, S15, S17 and S19, the control state of the communication partner's video camera is requested by status-signal return request command SO (step S20), and it is awaited until the desired control state is provided (step S21).

Thereafter, it is checked if the user's apparatus is connected to the communication partner's apparatus (step S22). If the result of the check is negative, the process returns to step S9. If the result of the check is affirmative, it is checked if a calling operation is being performed (step S23). If the result of the check is affirmative, the process returns to step S9, and the processing and control corresponding to the user's operation are performed (steps S9–S21).

When the calling operation has been completed, the process proceeds from step S23 to step S24, in which it is checked if the user's apparatus is connected to the communication partner's line. If the result of the check is negative, the communication partner is again called (step S25), and the processing after step S9 is repeated. That is, by executing the above-described steps S12–S21 after the user's apparatus has been connected to the communication partner's line, the communication partner's camera is controlled on the monitor of the user's terminal.

After the line connection has been completed, data of the functions of the user's camera and the communication partner's camera are exchanged (step S26). After the data exchange has been completed, camera-view icon 38 (or 174) corresponding to the functions of the communication partner's camera is displayed on the monitor picture surface (step S27).

After the meeting or conversation has ended, processing to terminate communication is executed. That is, if it is desired to disconnect the line (step S30), the user instructs deletion of camera-view icon 38 (or 174) of the communication partner's camera by, for example, superimposing it on a refuse-bin icon as processing to disconnect the line (step S31). The main-body CPU thereby determines that instruction to disconnect the line has been performed, and instructs a communication control circuit incorporated in or provided outside the apparatus to disconnect the line. After the line has been disconnected, the main-body CPU first flashes the camera-view icon of the communication partner's camera for a predetermined time period, and then erases it from the monitor picture surface. The process then returns to step S9, and start of the next communication is awaited. That is, in the present embodiment, communication can be disconnected only by erasing the microprocessor of the communication partner's camera.

In the present embodiment, the user's camera and the communication partner's camera can be intuitively operated by providing a graphical user interface. As a result, the operability of each camera is improved. Furthermore, since control icons are provided around a display image from the communication partner's camera, the communication partner's camera can be operated while watching the communication partner.

Alternatively, an arbitrary point within camera-image display area 12 shown in FIG. 2 may be selected, and the video camera to be controlled may be panned or tilted around that point. For that purpose, the relative coordinates of an assigned point within or outside camera-image display area 12 are calculated, the panning angle and the tilting angle are calculated from the calculated coordinate values. After confirming that the assigned point is within a movable range, the video camera to be controlled is rotatably driven by assigning the absolute values of the calculated angles.

In another approach, an arbitrary range within camera display/control window 10 and within or outside camera-image display area 12 may be selected, and panning, tilting and zooming of the video camera to be controlled may be integrally controlled so that an image within the selected range is fully displayed in camera-image display area 12. For that purpose, the relative coordinates of a central point of the selected range within or outside camera-image display area 12 are calculated, control values for panning and tilting are calculated in the above-described manner, a zooming value for fully displaying the selected range in camera-image display area 12 is calculated, and panning, tilting and zooming of the video camera to be controlled are controlled in accordance with the calculated values.

Figure 15:
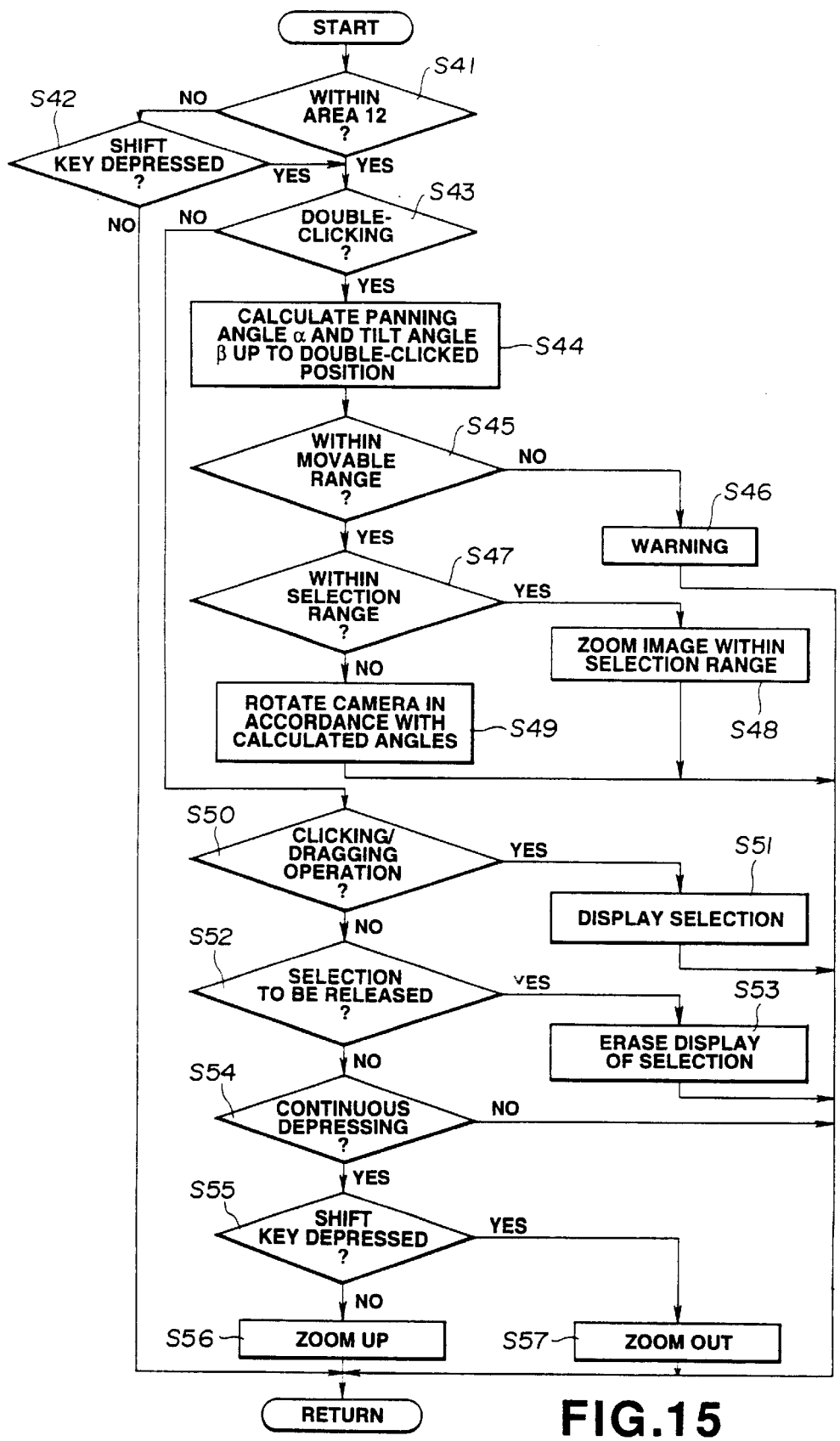
FIG. 15 is a flowchart of another routine for assigning panning, tilting and zooming.

FIG. 15 is a flowchart of a routine to realize the above-described operations. This routine may, for example, be inserted between any steps from step S12 to step S23, preferably, between steps S22 and S23.

The mouse is clicked for positions within camera-image display area 12 (steps S41 and S43), or the mouse is clicked while depressing the shift key for positions outside camera-image display area 12 but within camera display/control window 10, for example, positions indicated by reference numerals 14 and 16 shown in FIG. 1, (steps S41, S42 and S43). By a dragging operation in the clicked state (step S50), it is understood that the selection of the range has been assigned (step S51). The assigned range is subjected to dicriminative display on the monitor picture surface using a frame, reversal display or the like. If an upper left portion of the selected range is subjected to double-clicking (step S52), it is understood that the selection is released, and the discriminative display of the selected range is erased (step S53).

If the clicking operation continues for at least a predetermined time period (step S54), and if the shift key is depressed (step S55), the camera to be controlled is zoomed out (step S57). If the shift key is not depressed (step S55), the camera to be controlled is zoomed up (step S56). That is, by holding the mouse for a predetermined time period, the camera can be zoomed out or zoomed up after the necessary panning and tilting have been performed.

When the mouse has been subjected to double-clicking within camera-image display area 12 (steps S41 and 43), or when the mouse has been subjected to double-clicking in the condition of depressing the shift key for a point outside camera-image display area 12 but within camera display/control window 10 (steps S41, S42 and S43), the panning angle α and the tilting angle β making the double-clicked position the center of a photographing operation are calculated (step S44). If the calculated values indicate a region outside the movable range (step S45), the fact is displayed and/or a warning is given using an image and/or voice (step S46).

If the calculated values indicate a range within the movable range (step S45), and if the double-click operation is performed for a point within the selected range (step S47), an image within the selected range is zoomed up on the full picture surface (step S48). If the double-clicking operation is performed for a point outside the selected range (step S47), the camera to be controlled is panned and tilted for the calculated angles.

Figure 16:
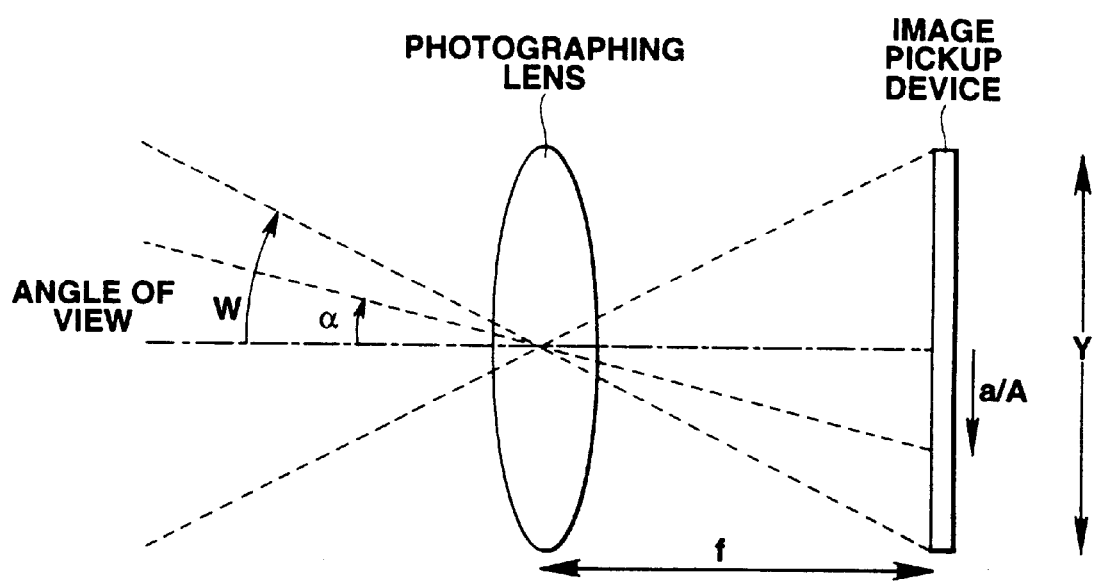
FIG. 16 is a diagram illustrating the relationship between the focal length of the lens, the size and the angle of view of the image-pickup device.

Next, the relationship between the focal length of the lens, the angle of view W and angle of rotation θ of the video camera will be briefly described with reference to FIG. 16. The case of panning will be considered. If the horizontal width of the image pickup device is represented by Y, and the focal length of the photographing lens is represented by f, the following relationship holds:

$$\tan w = Y/2f.$$

Figure 17:
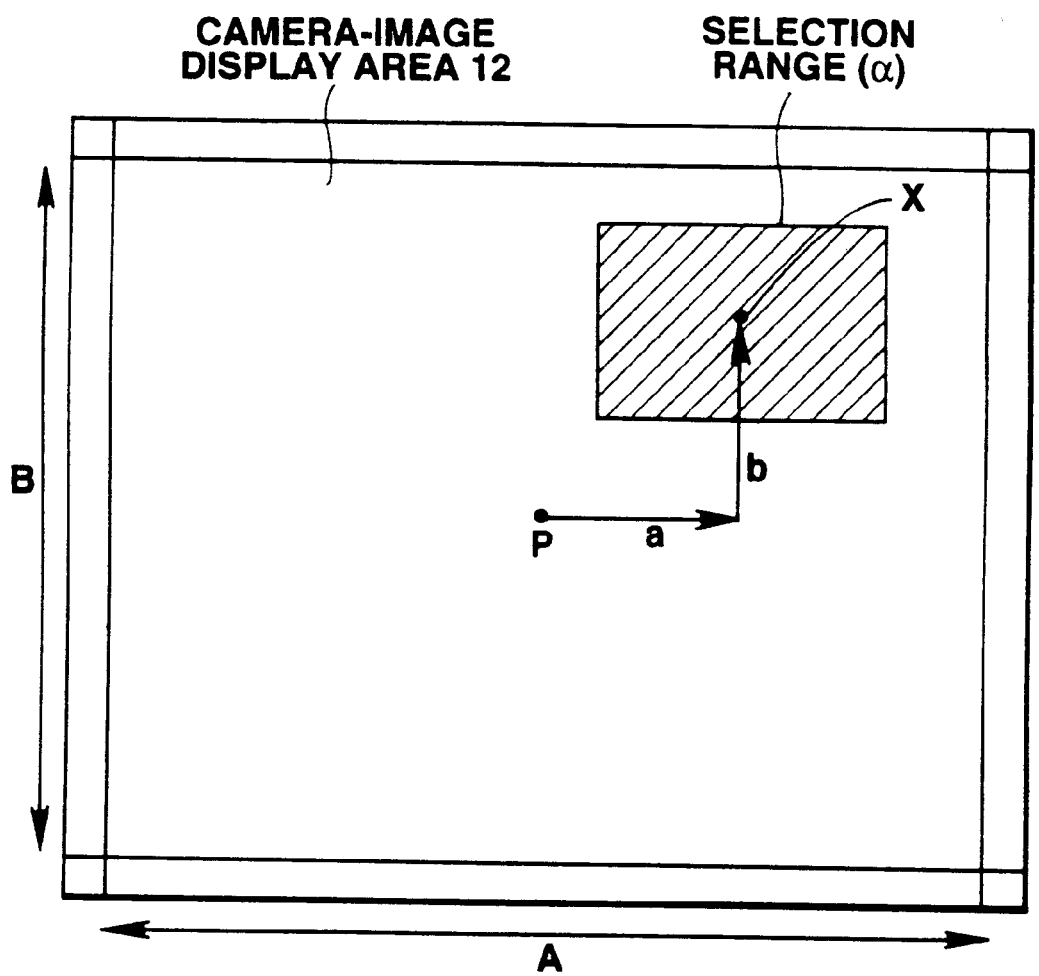
FIG. 17 is a diagram illustrating the size of camera-image display area 12.

As shown in FIG. 17, if the horizontal width of camera-image display area 12 is represented by A, the horizontal distance between point P in camera-image display area 12 and point X designated by a mouse operation or the center of the selected range (α) is represented by "a", and the necessary panning angle is represented by α, the following relationship holds:

$$\tan \alpha = (Y/2f) \times (a/A).$$

The value α can be obtained from this expression.

The same kind of calculation can also be performed for the vertical direction.

Although the present invention has been described illustrating a video conference system, the present invention may, of course, be applied to a visual telephone, or a system to communicate or transmit a static image.

As will be easily understood from the foregoing description, according to the above-described embodiments, it is possible to control a video camera with a very simple and intuitive operation.

The individual components shown in outline or designated by blocks in the drawings are all well known in the electronic apparatus and the control method therefor arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image communication apparatus for performing image communication with a terminal of a communication partner having an image pickup device via a communication circuit, said apparatus comprising:

reception means for receiving an image picked up by said image pickup device from said terminal of the communication partner;

display means for displaying the image received by said receiving means in a window within a screen;

indication means for indicating a position inside the window so as to operate an image pickup range of the image pickup device of said terminal of the communication partner, or alternatively for indicating a position outside the window; and transmission means for calculating a control amount to change the image pickup range from the position indicated by said indication means and transmitting a control signal including the control amount to said terminal of the communication partner, wherein, when said indication means indicates a position outside the window, said transmission means calculates the control amount to change the image pickup range based on the position outside the window indicated by said indication means.

2. An apparatus according to claim 1, wherein the image pickup device comprises a camera, and wherein the image comprises one of a motion-image and still-image.

3. An apparatus according to claim 1, wherein said apparatus comprises one of a workstation and a personal computer.

4. An apparatus according to claim 1, wherein the indication means includes a mouse for performing a click-and-click drag operation.

5. An apparatus according to claim 1, wherein the control signal includes information regarding controlling a zoom of the pickup device.

6. An apparatus according to claim 1, wherein the terminal of the communication partner starts controlling the pickup device in response to an operation of a icon displayed on the display.

7. An apparatus according to claim 1, wherein operation of said indication means for indicating a position outside of the window by is different from operation of said indication means for indicating a position within the window.

8. An apparatus according to claim 7, wherein operation of said indication means for indicating a position outside the window requires a predetermined operation simultaneously with operation of said indication means for indicating a position within the window.

9. A method for controlling an image communication with a terminal of a communication partner having an image pickup device via a communication circuit, said method comprising the steps of:

receiving an image picked up by said image pickup device from said terminal of the communication partner;

displaying the image received in said receiving step in a window within a screen of a display device;

indicating a position inside the window so as to operate an image pickup range of the image pickup device of said terminal of the communication partner, or alternatively indicating a position outside the window; and calculating a control amount to change the image pickup range from the position indicated in said indicating step and transmitting a control signal including the control amount to said terminal of the communication partner, wherein when said indicating step includes indicating a position outside the window, said calculating and transmitting step includes calculating the control amount to change the image pickup range based on the position outside the window indicated in said indicating step.

10. A method according to claim 9, wherein the image pickup device comprises a camera, and wherein the image comprises one of a motion-image and a still-image.

11. A method according to claim 9, wherein said apparatus comprises one of a workstation and a personal computer.

12. A method according to claim 9, wherein the indicating step includes a mouse click-and-drag operation.

13. A method according to claim 9, wherein the control signal includes information regarding controlling a zoom of the pickup device.

14. A method according to claim 9, wherein the terminal of the communication partner starts controlling the pickup device in response to an operation of an icon displayed on the display.

15. A method according to claim 9, wherein the step of indicating a position outside the window is different from the step of indicating a position within the window.

16. A method according to claim 15, wherein the step of indicating a position outside the window requires a predetermined operation simultaneously with the step of indication a position within the window.

* * * * *

UNITED STATES PATENT AND TRADEMARK OFFICE
CERTIFICATE OF CORRECTION

PATENT NO. : 6,433,796 B1  Page 1 of 1
DATED : August 13, 2002
INVENTOR(S) : Tomishige Taguchi It is certified that error appears in the above-identified patent and that said Letters Patent is hereby corrected as shown below:

Column 4,
Line 41, "(";"" should read -- (":" --.

Column 7,
Line 36, "requenst" should read -- request --.

Column 10,
Line 34, "therefor arts and" should read -- arts and therefor --.

Column 11,
Line 20, "a" should read -- an --; and
Line 24, "by" should be deleted.

Signed and Sealed this

Thirty-first Day of December, 2002

JAMES E. ROGAN
*Director of the United States Patent and Trademark Office*